(12) United States Patent
Davis (10) Patent No.: US 6,243,242 B1
(45) Date of Patent: Jun. 5, 2001

(54) PHOTOGRAPHIC LIGHTNING TRIGGER DEVICES

(76) Inventor: Richard F. Davis, 28665 Rd. P.8, Delores, CO (US) 81323

( * ) Notice: Subject to any disclaimer, the term of this patent is extended or adjusted under 35 U.S.C. 154(b) by 0 days.

(21) Appl. No.: 09/544,785

(22) Filed: Apr. 7, 2000

Related U.S. Application Data (63) Continuation-in-part of application No. 09/135,698, filed on Aug. 18, 1998, now abandoned.

(51) Int. Cl.[7] .............................. H02H 3/00; G01W 1/00
(52) U.S. Cl. ............................................ 361/1; 73/170.24
(58) Field of Search ....................... 340/601; 73/170.24; 324/72; 307/86, 64, 65, 66; 342/460; 361/1

(56) References Cited

U.S. PATENT DOCUMENTS

| | | | |
|---|---|---|---|
| 3,700,336 | 10/1972 | Clegg | 356/226 |
| 3,712,195 | 1/1973 | Harvey | 95/11 |
| 3,759,152 | 9/1973 | Fletcher | 95/11 |
| 3,934,259 | 1/1976 | Krider | 354/94 |
| 4,051,496 | 9/1977 | Iida et al. | 354/219 |
| 4,707,127 | 11/1987 | Goedken | 354/266 |
| 5,184,215 | 2/1993 | Barker | 358/93 |
| 5,255,038 | 10/1993 | Suzuka | 354/266 |
| 5,396,220 | * 3/1995 | Markson et al. | 73/170.24 |
| 5,448,161 | 9/1995 | Byerley, III | 324/72 |
| 6,061,216 | * 5/2000 | Fuqua, III | 361/1 |

* cited by examiner

Primary Examiner—W. B. Perkey
(74) Attorney, Agent, or Firm—Mills Law Firm PLLC (57) ABSTRACT

A method and device for detecting and photographing unregulated light flash events such as lighting strikes during both daylight and night time conditions is disclosed by detecting the initiation of the lightning stepped leader event of the immediate lightning flash for photographic and detecting activities. The present device utilizes a photodiode sensor in conjunction with a photoresistor to control feedback gain of a transimpedance amplifier to detect an unregulated, omni-directional flash of light and produces an output signal that is input to an analog comparator circuit where a predetermined threshold level is set to prevent false triggering of the isolation relay(s) and/or camera shutter. The output from the comparator circuit is input to a timer circuit to produce a signal of sufficient duration to trigger the isolation relay(s) and/or camera shutter. The output signal from the timer circuit is sent to isolation relays and/or an infrared coded pulse generator depending on the features of the particular camera in order to release the camera shutter or to protect an electronic or electrical device from the damaging effects of the lightning return stroke. In an alternative embodiment the functions of the comparator circuit, the timer circuit and the coded pulse generator are carried out by a programmable logic device such as a mixed signal processor with analog, digital, real time clock and non-volatile RAM capability wherein the lightning event processing functions are incorporated into the program code. The device circuitry is incorporated into a compact enclosure which can be mounted directly onto the camera or, or in the alternative integrated into the camera housing.

18 Claims, 9 Drawing Sheets

PHOTOGRAPHIC LIGHTNING TRIGGER DEVICES

RELATED APPLICATIONS

This application is a continuation-in-part application of U.S. Ser. No. 09/135,698 filed on Aug. 18, 1998 now abandoned, in the name of R F. Davis and entitled "Photographic Lightning Trigger Device".

FIELD OF INVENTION

The present invention relates generally to devices for detecting lightning events and, more particularly, to a method and apparatus for photographing and detecting lightning.

BACKGROUND OF THE INVENTION

Lightning photography is a popular form of artistic expression commonly found in pictorial books and magazines. Such dramatic photographs of bolts of lightning have great visual impact.

Scientific uses of lightning photography are also well known to those skilled in the art. Lightning photography with conventional cameras is restricted to the well-known practice of using long exposure times, usually at night or in low ambient light levels. The lightning event is captured on film during the time period when the camera shutter is held open, which is typically five to ten minutes, requiring the use of a camera tripod.

However, the methods of the prior art are tedious and time consuming and do not provide for lightning photography during normal daylight hours. Further, the photographer must remain out of doors with the camera equipment and be exposed to the hazards of lightning.

Thus, the present invention has been developed to provide a lightning trigger device capable of interfacing with many commercially available cameras having sufficiently fast shutter lag times during both daylight and nighttime conditions.

In addition, the present camera triggering method can be practiced by utilizing the camera's remote shutter release, thereby photographing lightning events from a safe distance. Further, the cost of the present lightning trigger device is substantially lower in comparison to other automated methods of photographing lightning.

The present invention may also be utilized to detect the initiation of the stepped leader phase of the lightning event for preemptively disconnecting susceptible electronic and electrical devices via fast acting relays before the incipient and destructive return stroke occurs. Devices that may benefit by preemptive protection from the damaging effects of the return stroke and subsequent electromagnetic pulses (EMP) include electronic and electrical devices such as computers, telephones, household and industrial appliances, and the like. Back up power supplies may be incorporated with the lightning trigger detection device to ensure continuous operation and protect against a loss of service, data or critical operation.

DESCRIPTION OF RELATED PRIOR ART

U.S. Pat. No. 5,184,215 to Barker discloses an automated system for detecting and recording lightning strikes in the vicinity of power lines. In one embodiment of the invention, the automated system includes a toroid surge sensor; a phototransistor optical sensor located within a pole mounted housing; a magnetic loop sensor; a control circuit for one or more cameras and/or video camcorders; and a power supply all contained within a weather-tight housing. Such a system clearly lacks portability and is designed specifically for the monitoring of electrical power transmission utilities.

U.S. Pat. No. 5,448,161 to Byerley et al. discloses an optical radiation detector for lightning or other light signals such as pulses, bursts, flashes, and steady fluctuations. A silicon photodiode or other light-sensitive silicon device is arranged to receive light signals in the infrared, visible, ultraviolet, and wide-band ranges, etc.

U.S. Pat. No. 3,759,152 to Fletcher discloses a system for monitoring and recording lightning strikes within a predetermined area with a camera having an electrically operated shutter and means for advancing the film in the camera after activating the shutter. The system includes an antenna for sensing electrical field changes which generate a signal that is fed to an electronic circuit for operating the shutter of the camera.

U.S. Pat. No. 3,712,195 to Harvey discloses an apparatus for photographing meteors in a selected area of the sky only at times meteors are likely to be passing through the area. A photo multiplier is pointed in the direction of the designated area. When a meteor passes through the area, the signal output of the photo multiplier increases, activating a camera.

U.S. Pat. No. 3,700,336 to Clegg discloses a method for optically detecting lightning radiation in both daylight and nighttime conditions. A silicon solar cell receives light radiation, converting them to electrical signals which are amplified and electronically processed for recording purposes. However, this apparatus is not used in conjunction with photographic equipment.

U.S. Pat. No. 3,934,259 to Krider discloses an all-sky camera apparatus for time-resolved lightning photography. This invention utilizes a pair of all-sky cameras which are disposed with their respective lenses pointing vertically. One of the cameras is rotated about an axis passing through the zenith while the other is maintained in a stationary disposition to determine the time development of lightning discharge.

U.S. Pat. No. 5,255,038 to Suzuka discloses a remote control apparatus of a camera having a camera body with a finder eyepiece window including an infrared receiver which is associated with the shutter of a camera body. A remote release signal emitted from an infrared transmitter is received by the infrared receiver to release the shutter of the camera body.

U.S. Pat. No. 4,707,127 to Goedken discloses an auto-wireless shutter release control that will allow the user to take a photograph by remote control.

U.S. Pat. No. 4,051,496 to Iida et al. discloses a remote control camera having a fitting member for mounting thereon a signal receiving device to receive a remote control signal, the body of the signal receiver, when fitted on the camera body, serving to cover the entire eye-piece on the camera body to intercept light entering into the camera body through the eye-piece.

U.S. Pat. No. 4,926,284 to Eugenio discloses a lightning protection device for directly sensing a predetermined critical electrostatic field intensity of the stepped leader to prevent the formation of the return stroke. The device uses a charge storing sphere and a varistor grounding device to dissipate the charge of the otherwise incipient return strokes.

U.S. Pat. Nos. 5,521,603 and 5,297,208 to Young disclose are electric field sensing devices for lightning detection and method for deactivating electrical equipment.

U.S. Pat. No. 4,276,576 to Uman discloses a lightning protection device utilizing electric or magnetic field responsive detectors and means for isolating or grounding electrical equipment.

U.S. Pat. No. 5,057,820 to Markson et al. discloses an optical warning system for distinguishing between strobe light flashes and lightning flashes and providing audio and visual indication of detection to an operator.

SUMMARY OF THE INVENTION

After much study of the above described problems, the present invention has been developed to provide a photographic lightning trigger and detection device which will provide the artistic and/or recreational photographer with a compact, lightweight device which allows the user to safely obtain lightning photographs using a handheld camera while inside a car, house, or other protected structure.

The user may also use the lightning trigger device attached to such a handheld camera mounted on a camera tripod when photographing lightning events from a safe distance utilizing the camera's remote electronic or infrared shutter release.

The lightning trigger and detection device can also be used as a sensor for utilizing the initiation of the stepped leader for preemptive protection of electrical and electronic devices before the damaging return strokes can occur.

More particularly, the photographic lightning trigger and detection device functions to detect an unregulated, omni-directional flash of light by the use of a photodiode sensor and a trans-impedance amplifier with an automatic variable gain control which causes the camera shutter to be released in response to the lightning flash. The device further incorporates a timing finction for preventing undesirable repetitive film exposures when through-the-lens method of sensing of the lightning flash is utilized.

In photographic applications, the automatic camera metering circuits may be preactivated for minimizing the camera shutter lag time while at the same time isolating the camera and lightning trigger voltage supplies.

Detection may be accomplished in several manners utilizing distinctive characteristic of the lightning flash. Whereas, prior art detection methods rely upon sensing the wide-band event of the lightning flash or the presence of unusually high electromagnetic field intensities for predicting lightning activity, the present invention employs the additional preemptive benefit of detecting the stepped leader. Two significant characteristics suitable for detection are utilized; the pulsing propagating components of the stepped leader, and the relatively long duration between the initiation and completion of the stepped leader.

Accordingly, the invention may be employed to benefit several forms of existing technologies and practices, lightning photography being one advantageous application.

In view of the above, it is an object of the present invention to provide a photographic lightning trigger device which is practical for use by the artistic and/or recreational photographer using a handheld camera.

Another object of the invention to provide a sensing system for detecting the initiation of the stepped leader phase of a lightning stroke for the protection of auxiliary electrical loads.

Another object of the present invention is to provide a photographic lightning trigger device which functions to respond to an unregulated, omni-directional light event and to instantaneously cause the camera shutter to be released.

Another object of the present invention is to provide a method for optically detecting events utilizing a photodiode and trans-impedance amplifier with an automatic variable gain control for use in conjunction with a handheld camera or other auxiliary devices.

Another object of the present invention is to provide a device that allows the user to safely obtain lightning photographs using a handheld camera while inside a car, house, or other protective structure.

Another object of the present invention is to provide a photographic lightning trigger device which enables lightning photography to be performed during both daylight and nighttime conditions.

Another object of the present invention is to provide a photographic lightning trigger device of a lightweight and compact size which may be integrated into the camera housing, mounted directly onto the camera shoe fitting, or incorporated into a small pocket-sized enclosure.

Another object of the present invention is to use fiber optics for focusing a lightning flash sensor to the field of view of the camera lens.

Another object of the present invention is to provide a preemptive lightning sensor for protecting electrical devices from lightning related electrical damage.

Another object of the present invention is to provide a means for minimizing the shutter lag time prior to recording a lightning flash.

Another object of the present invention is to provide for a method of sensing the initiation of the stepped leader and controlling an auxiliary device prior to the occurrence of the return stroke.

Another object of the present invention is to provide for a method of protecting electronic and electrical devices through the use of lightning trigger-detection device by preemptively disconnecting and protecting electronic devices from damaging electrical surges before the subsequent return strokes occur.

BRIEF DESCRIPTION OF THE DRAWINGS

The above and other objects and advantages of the present invention will become apparent upon reading the following detailed description taken in conjunction with the accompanying drawings in which.

DETAILED DESCRIPTION OF THE PREFERRED EMBODIMENTS

Prior to discussing the lightning trigger device of the present invention in detail, it may be beneficial to briefly review some basic definitions and characteristics of lightning. There are two major types of lightning flashes; cloud-to-cloud and cloud-to-ground. The primary characteristic of a lightning flash is the transfer of electrical charge. The secondary characteristic is the electromagnetic fields that result from the changing electric field. The tertiary characteristic is the luminous corona that results from the ionization of atmospheric gases around the electrical discharge path.

Cloud-to-ground lightning flashes are noted for the luminous bolt, which is dramatic and potentially destructive to the object struck. Cloud-to-cloud lightning flashes are most often observed as an illumination of the cloud, wherein the cloud acts as a diffuser and scatter the light of the flash channel.

In the simplest form, lightning flash detection may involve merely detecting the bulk event such as for photographic purposes. However, detection of a lightning flash at the earliest event in the sequence provides a significant advantage over bulk event detection. More particularly, a cloud-to-ground flash comprises a sequence of events that occur over several hundred milliseconds including the preliminary breakdown process, the stepped leader, the initial return stroke, dart leaders and subsequent return strokes. Each of the foregoing has characteristics that are unique while sharing other characteristics in common.

For purposes of the present invention, certain characteristics of the stepped leader are used for facilitating preemptive activities, photographic and protective. Thus, in photographic applications, the detection of the stepped leader is used for initiating shutter opening prior to the return stroke. Such preemptive sensing is also used for disconnecting susceptible devices prior to the occurrence of the destructive characteristics of the return stroke.

As discussed in greater detail below, unique characteristics of stepped leader utilized in the present invention include a 20 kHz center band frequency of the periodic luminous and electromagnetic impulses, a rapid impulse rise time representative of a 1 MHz saw tooth wave form, and a preemptive interval of about 20 milliseconds prior to the initial return stroke. Singularly or in combination these characteristics are employed preemptively for initiation and protection activities with associated devices.

For bulk lightning flashes, the return stroke characteristics may be effectively utilized, including peak amplitude and electromagnetic and luminous rise times, i.e. about 1 microsecond. The latter is also commonly characteristic of the preliminary breakdown process on the dart leader.

Against this background, various optical and antennae sensor may be used, coupled with feedback sensors, and filtering, comparing, and discriminating circuitry for initiating various activity, control, and protection tasks.

For further reference, as recited in the book, Lightning by Martin A. Uman, and for purposes of this application, a ground strike lightning flash is characterized by a so called leader stroke, typically 20 milliseconds in duration followed by a series of return strokes lasting one millisecond. Such return strokes typically occur from 40 to 80 milliseconds apart for the duration of the ground strike lightning flash, typically 10 to 200 milliseconds. Such phenomena are additionally described in "Spectrum of the Stepped Leader", by Richard E. Orville, Journal of Geophysical Research; "The Relative Light Intensity Produced by a Lightning Stepped Leader", by E. Phillip Krider; Journal of Geophysical Research; and "Spectrum of the Lightning Dart Leader" by Richard E. Orville, Journal of Atmospheric Sciences.

More particularly, a cloud-ground lightning flash is characterized by plural phases or events. Initially, an electric charge builds up between a cloud and the ground. Subsequently, a first phase or preliminary breakdown process of electrically charged regions, referred to as a "stepped leader", establishes a conductive channel between cloud and ground. Thereafter a series of return strokes are propagated. The return strokes are spaced by "dart leaders". The return strokes dissipate the charge between cloud and ground.

The aforementioned preliminary breakdown process is further characterized by an initial intracloud luminous phase, lasting a hundred milliseconds or more, that precedes the emergence of the stepped leader from the cloud base. This breakdown process is characterized by a wide-band RF emissions spectrum in the very low frequency range of 0 to 130 kHz. The electric field change during the preliminary breakdown is characterized as being bipolar with impulses having a 10 microsecond rise time and 50 microseconds duration, with several 1-microsecond width pulses superimposed over the initial half cycle.

The stepped leader is 2 to 30 milliseconds in duration, typically about 20 milliseconds, and characterized by a periodic progression of propagating impulses that establish the primary cloud-ground conductive channel for the return stroke. The luminous characteristics of each propagating impulse are asymmetric and typically have a 1-microsecond rise time and a 1 to 2 microseconds half-peak fall time, characteristic of a 1 MHZ saw tooth wave form. The corresponding luminous frequency of the stepped leader for sensing purposes possesses a primary frequency range of 500 kHz to 2,500 kHz. The propagating luminous impulses typically have a between pulse period of 30 to 125 microseconds, representative of a center band frequency of 20 kHz (50 microseconds average period). The luminous characteristics of the stepped leader, typically 20 to 100 times less intense than the return stroke, are observed in a spectral range of 560 to 660 nanometers (nm). The RF characteristics of the stepped leader are wide-band with a peak amplitude frequency of 20 kHz. The stepped leader electric field peak rise time is on the order of 1-microsecond or less corresponding to an approximate frequency of 500 to 2,500 kHz.

The return strokes are contrasted by as having a luminous phase with a 1 microsecond rise time, and a 70 microseconds duration. The return strokes occur in a series, spaced 40 to 80 milliseconds apart for the duration of the lightning flash. A typical lightning flash lasts between 40 and 200 milliseconds. The return stroke has wide-band RF characteristics, ranging from DC to and beyond the microwave region (1 Ghz). The electric field pulse of the return stroke is characterized as having a peak amplitude frequency of 5 kHz with the first return stroke rise time of 2 to 8 microseconds to half peak followed by a rise time of half to peak on the order of 100 nanoseconds.

The dart leader immediately precedes each return stroke. Typically, the dart leader has a luminous duration of about 25 microseconds. There is also a luminous delay of about 10 microseconds between the dart leaders and the return strokes. The dart leader has wide-band RF emissions similar to the return stroke. With increasing emission frequency, there is an increasing period between the luminous completion of the dart leader of 0 to 250 microseconds. The luminosity of dart leader is approximately 12% of that of the succeeding return stroke.

Cloud to cloud lightning events may also occur through distinct electrical paths as in the case of the ground strike described above or may occur as so-called sheet lightning with near whole cloud involvement. Cloud to cloud lightning flashes may also possess the stepped leader phase.

A distinct advantage of sensing the stepped leader optically is that there are very few naturally occurring or manmade sources of light, which are unregulated omni-directionally pulsed at the stepped leader frequencies. In contrast, there are many sources of noise that can interfere with and cause false signals through lightning detection systems utilizing the radio frequency (RF) range, such as the simple switching of household and industrial appliances. Furthermore, the wide-band RF emissions of lightning correspond very closely with frequencies assigned by the United States Federal Communications Commission including the RF frequency ranges of 6 to 300 kHz are assigned to maritime, land and aeronautical navigation and communications and higher ranges corresponding to lightning frequencies, such as 540 to 1,700 kHz assigned to AM radio transmissions. Further, the RF 20 kHz center band frequency and the one-microsecond electric field rise times (500 to 2,500 kHz) are also distinctive.

The spectral characteristic of a lightning flash of this invention is in the range of approximately 300 to 1100 nm. This range is the principal emission spectrum of lightning in comparison to the full spectrum of a lightning flash being in the range of 300 Gm (1 kHz, RE) and extending beyond ultra-violet 300 nm (1 PHz). Also of interest are the luminous phase constituents of the preliminary breakdown, stepped leader and return stroke characterized by the one-microsecond rise times (approximately 500 kHz to 2,500 kHz) of their respective luminous phases and the luminous stepped leader representative impulse center frequency of 20 kHz.

In the present invention, a lightning trigger and detection device may optically sense discrete phase of the lightning flash, including the stepped leader, the dart leader and/or the return strokes. Further, the device discriminates between the ambient light level conditions and the rumination conditions of the lightning flash. Such detection is used to trigger the camera's shutter in order to capture the subsequent lightning strokes on film. The lag time capability of the camera, i.e. the time period when the shutter is triggered to release and the time the shutter actually opens, is of critical importance in order to achieve the shutter release in time for subsequent return lightning strokes to be recorded.

Single lens reflex cameras with so-called mirror lockup and electronic releases offer the fastest lag times. The Nikon F-5 in manual mode with the mirror pre-released and utilizing the electronic release provides the fastest available lag time of 21 milliseconds. Other cameras suitable for use with the present lightning trigger device include the Nikon F-4, the Sigma SA-5, and the Bronica GS-1. Cameras with marginal lag times that have electronic releases suitable for multiple stroke lightning flashes include the Nikon N2000 (96 ms) and the Canon Rebel (144 ms). Range finder cameras with an adaptation to accommodate an electronic and/or infrared release in manual mode also provide adequate lag times to record a lightning flash.

However, many commercially available cameras are not suitable for use with the present lightning trigger device. Such cameras may incorporate an electronic and/or infrared release, but do not have an override for automatic focusing and other functions. As a result, the lag times of such cameras are too slow to capture the lightning flash.

Based on the foregoing and referring to FIG. 1, a lightning trigger device 10 in accordance with the present invention will now be described in further detail. More particularly, the device 10 is mounted on the flash shoe fitting 12 of a camera 14, such as a Nikon F-5. The camera 14 includes a housing 16, a lens 18, a manual shutter release 20, auto focus and associated sensors 22, an infrared coded pulse receiver 24, and an electronic shutter release connector 26.

Since such single lens reflex cameras with the enumerated features are well known to those skilled in the art, further detailed discussion of the same is not deemed necessary.

In the embodiment shown, the lightning trigger device 10 is mounted on the flash shoe 12 of the camera 14 merely for the convenience of fixturing the device thereon. It will be understood that the lightning trigger device 10 does not integrate any functions between the camera 20 and the camera flash, nor does it connect electrically through any communication means with the flash shoe.

It is emphasized that the lightning trigger device 10 causes the camera shutter to be released in response to phases of a lightning event and not is response to the conventional shutter releasing function, as described hereinafter in further detail.

Thus, in various alternative embodiments the lightning trigger device 10 may be physically attached to the camera 14 by other means for convenience. For example, the lightning trigger device 10 may be attached to the threaded tripod-mounting hole (not shown) on the camera 14, secured by hook and loop material such as Velcro fasteners, located remote from the camera 14. Moreover, as shown in FIG. 2, the lightning trigger device 30 may be integrated with a camera 32 in the camera housing 34 preferably in the area of the flash shoe fitting 36. As shown in FIG. 1, a fiber optic cable 38 may be coupled through the viewfinder 40 or the lens 18, not shown, to the front lens 42 of the lightning trigger device for further prescribing line of sight sensing of the lightning flash.

Figure 1:
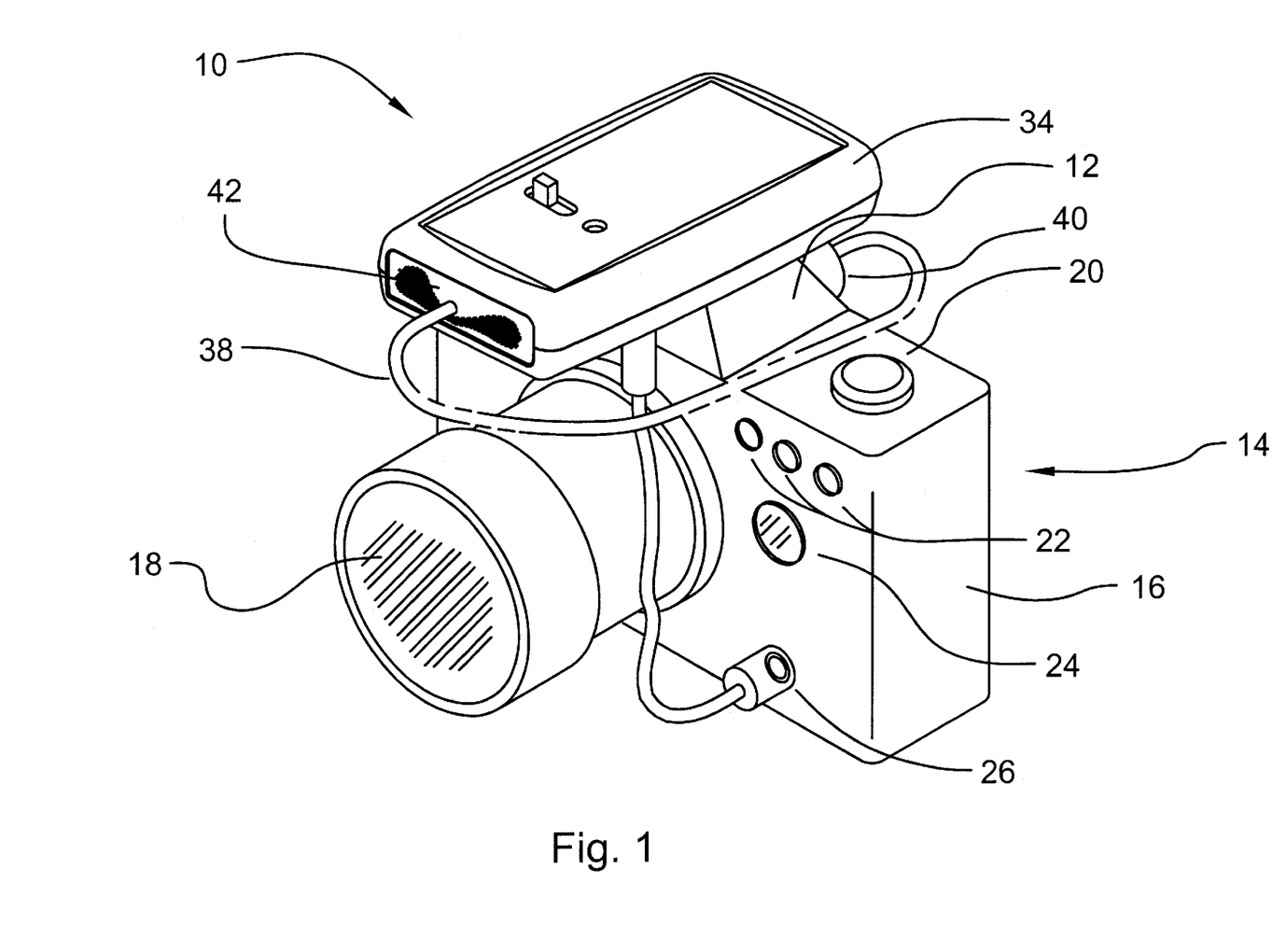
FIG. 1 is a perspective view of the lightning trigger device of the present invention shown mounted on a handheld camera.
Figure 2:
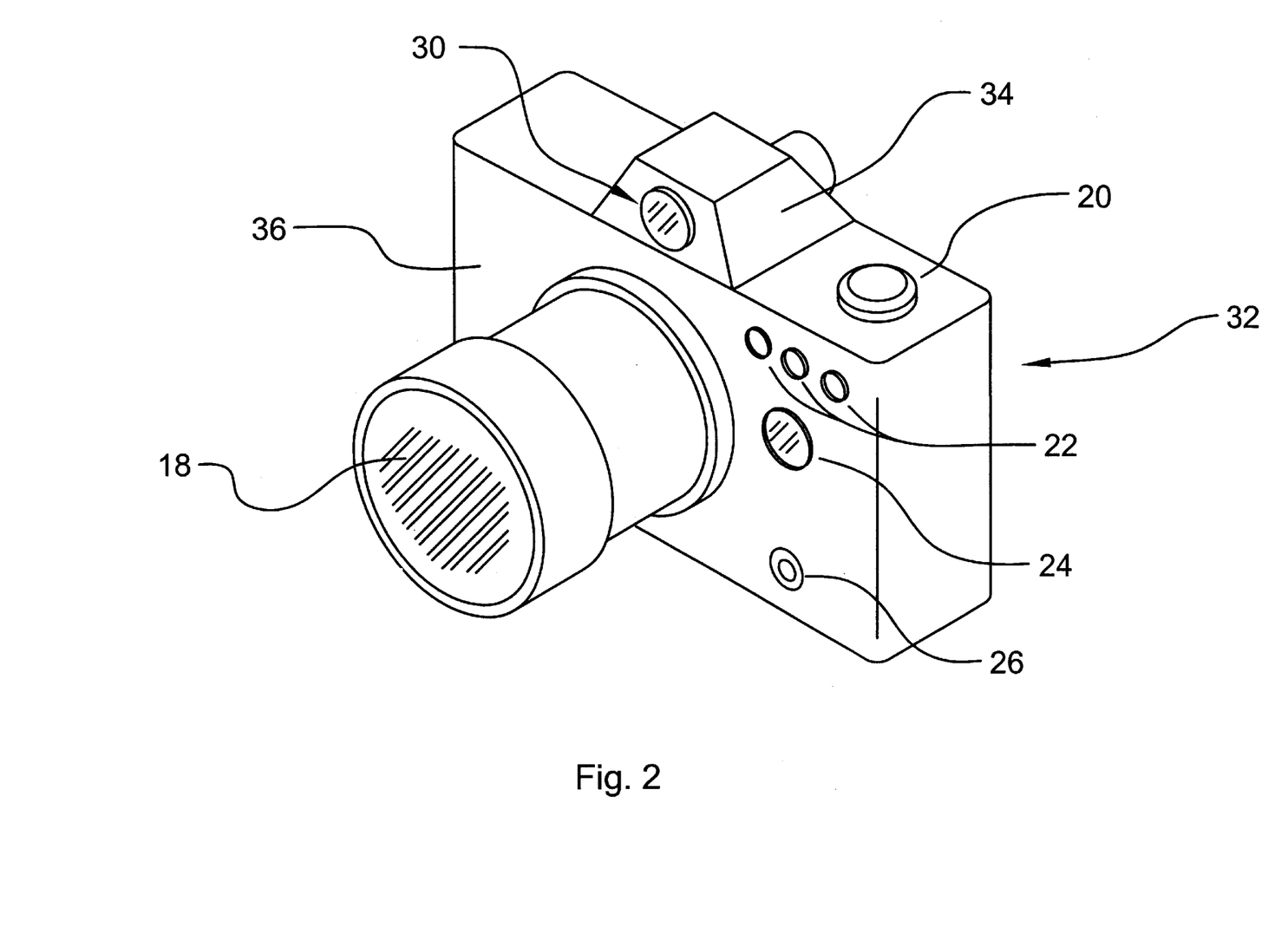
FIG. 2 is a perspective view of an alternative embodiment of the lightning trigger device shown integrated into the housing of a handheld camera.

In practical use, a lightning flash is received into the lightning trigger device 10 through the light gathering, transparent lens 42 as shown in FIG. 1. The lens 42 is either clear or colored as a filter to transmit only specific wavelengths of light. Further, a sensor hood, not shown, may also be incorporated to impart also a degree of directionality to the reception of the unregulated omni-directional flash event for the purpose of maximizing the opportunity that the camera field of view will record the lightning flash. Thereafter, the lightning flash is processed by the control circuitry contained inside the lightning trigger housing 34 or as otherwise integrated into the camera housing 36 as depicted in FIG. 2.

The circuitry and components associated with the lightning trigger device 10 are described in detail below. Referring to the embodiment shown in FIG. 3, the lightning trigger device 10 is composed of a photodiode sensor 50 including an integrated trans-impedance amplifier 52. A photodiode-trans-impedance amplifier 52 of the type known as a Burr-Brown OPT 101/210 is suitable for this purpose.

Figure 3:
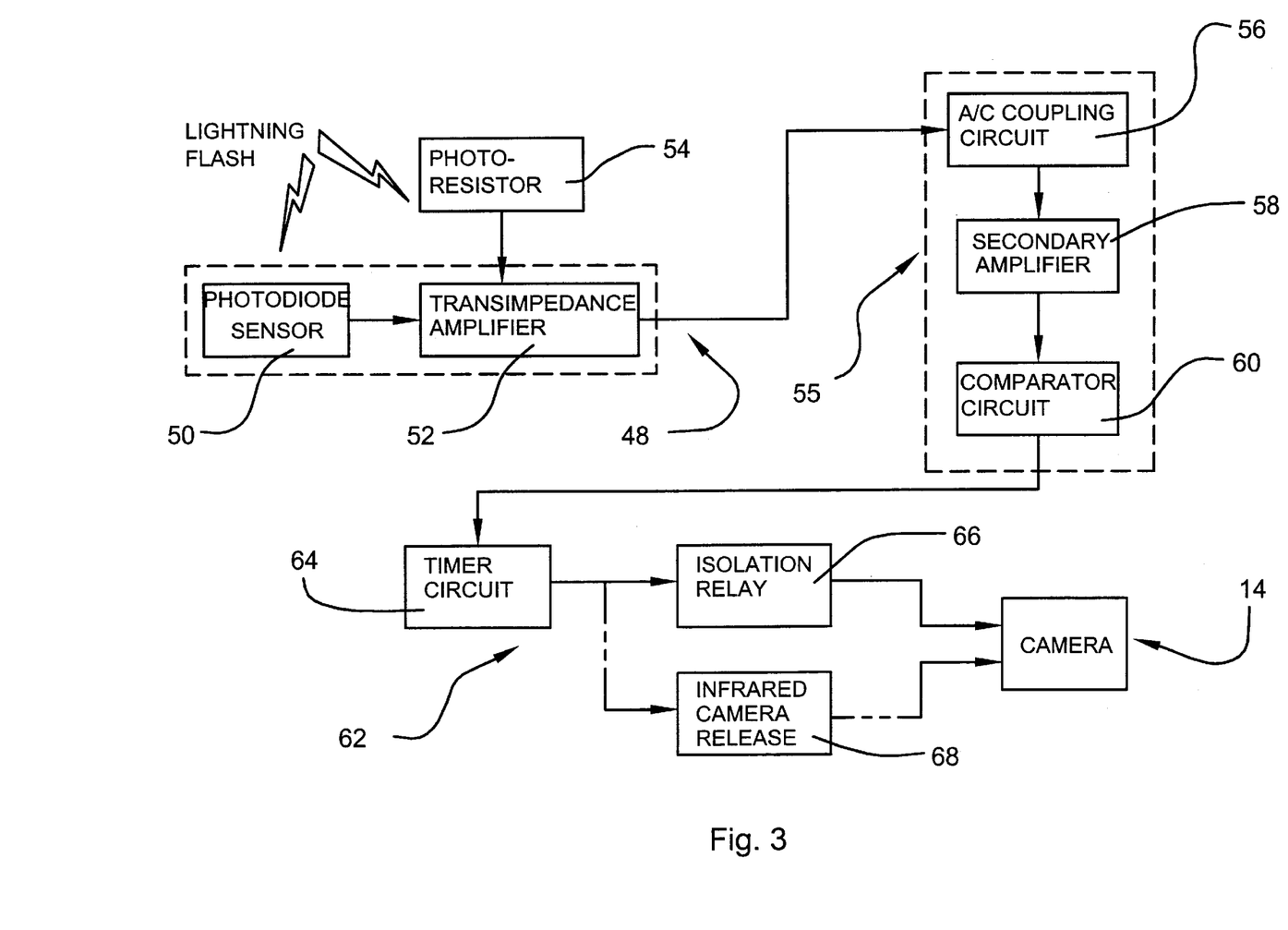
FIG. 3 is a block diagram of the preferred embodiment of the lightning trigger system showing the arrangement of the components thereof.

To obtain the proper sensitivity of the sensor circuit in both high and low i.e. day and night light levels, a secondary optical sensor is incorporated into the circuit. Such secondary optical sensor may be a photoresister 54 coupled to the amplifier 52 for automatically adjusting the gain of the circuit by providing feedback to the output, within the limits of the device, responsive to the difference between the ambient light and the lightning event levels. The gain provided automatically by the photoresistor 54 ranges from approximately 3,000 to 5 to 20 million depending upon the light level. The gain relationship is inversely proportional to light level so that the trans-impedance amplifier 52 is never saturated in either bright or dark modes. The photoresistor 54 is particularly well adapted for this application because it has maximum resistance in the dark mode and the response time is much slower than the photodiode sensor 50. The difference in response times tends to minimize cross-coupling of the two photosensors.

The secondary feedback optical sensor may also be a properly coupled photodiode, a phototransistor, or a photocell. It is also understood that fixed or adjustable resistive circuitry may be incorporated.

The primary sensors as well as the secondary feedback optical sensors are preferably selected for particular spectral response characteristics. For example, the photodiode sensor 50 may be selected for response to the primary spectral emissions of the stepped leader or return stroke. The feedback optical sensor, photoresistor 54, may be selected for broad band response characteristic of normal ambient light levels in order to facilitate optimum overall lightning flash response of the circuit.

The output from the flash detection system 48 is input to the lightning flash processing system 55. The lightning flash processing system 55 is characterized by distinguishing between the lightning event and ambient light levels and events, for lightning events such as return strokes and dart leaders. The system 55 includes a conventional alternating current (A-C) coupling circuit 56. The coupling circuit 56 passes only the current from a rapidly changing pulse produced by the photodiode sensor 50 in response to the lightning flash. The coupling circuit 56 is appropriate for detecting and photographing bulk lightning events.

The value of the A-C coupling circuit 56 defines the time constant of the circuit and is selected in order to block slower events such as those less than several hundred hertz in frequency. This will permit blocking signals from ordinary A-C incandescent and fluorescent lighting sources that would trigger the camera shutter. Additional processing includes further amplification of the signal from the A-C coupling circuit 56 via a secondary amplifier 58.

The signal from the coupling circuit 56 is input into an analog comparator circuit 60. The comparator circuit 60 sets a predetermined threshold level is set to prevent false triggering. The output signal from the comparator 60 goes high only when a sufficiently rapid flash event occur, indicative of a lightning event as opposed to ambient conditions.

The combination of these electronic components in the above described circuit yields an extremely sensitive lightning flash event sensor over a wide range of light levels for bulk lightning events.

Output from the comparator circuit 60 is input to a control system 62. The control system includes a timer circuit 64 that is utilized to hold the output high for a time sufficient to insure that a desired control activity, such as camera shutter release, will occur. For photographic purposes, a nominal one-second duration is utilized. The duration for other activities will vary with the requirements of the auxiliary components. For example, when utilizing the aforementioned fiber optic cable 38 for remote sensing through the camera lens 18 as shown in FIG. 1, the holding time of timer circuit 64 is increased to ensure that the camera mirror (not shown) return does not cause the feedback effect of a light flash and cause comparator circuit 60 to false trigger causing the camera shutter to be released repetitively. The nominal holding time duration of timer circuit in this embodiment should be equal to the shutter speed plus one-second.

Output from the timer circuit 64 is directed to an isolation relay 66 and/or an infrared camera release 68 depending upon the particular method the camera requires. The isolation relay 66 and the camera release 68 serve as a dry switches for the camera 20.

Figure 4:
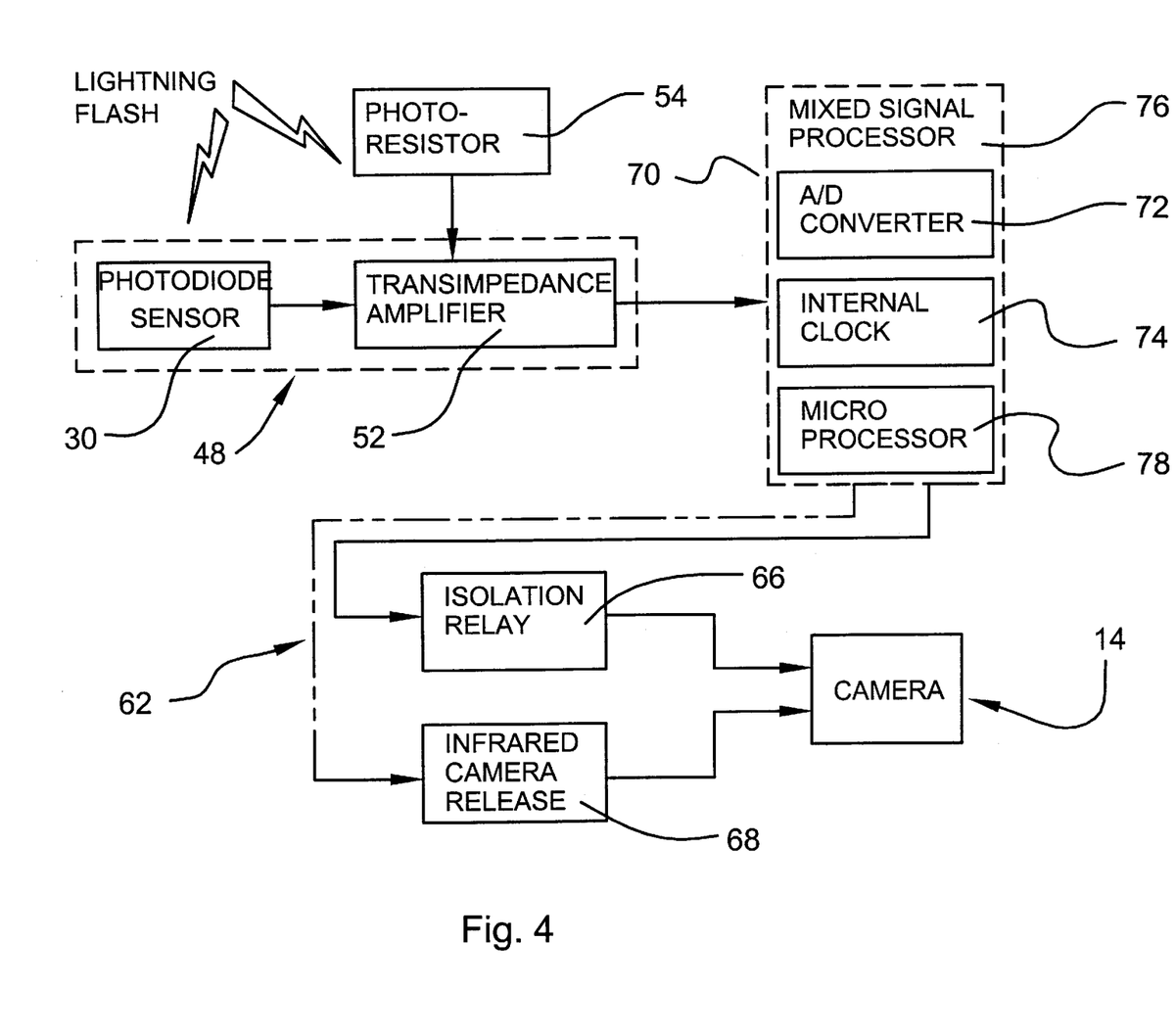
FIG. 4 is an alternative embodiment of the lightning trigger system showing the arrangement of the components thereof.

Referring now to FIG. 4, there is shown therein an alternative analog/digital embodiment of the lightning trigger device 10. In this embodiment the functions of the comparator circuit, and the timer circuit are included on a programmable logic device 70 with and analog/digital converter 72, and real time clock 74. A mixed signal processor 76 such as the Texas Instruments MSP430 mixed signal processor into which the lightning event processing functions can be incorporated into program code is suitable for this purpose.

In this embodiment of the circuit, a microprocessor 78 receives the digital output of the onboard analog/digital converter 72 after converting the voltage change from the sensor system 48 in response to the lightning flash.

After a flash event has been recognized as a change in light level within a prescribed time period or other criteria for response based on the lightning event selected for processing, the output is input to the isolation relay 66, which functions as a dry switch and closes. The coded pulse is also output to an infrared camera release 68, which alternatively causes the camera shutter to release. Again, the method used is dependent upon requirements of the particular camera. Programming may also be used to distinguish slower flash events of less than several hundred hertz such as incandescent or fluorescent lighting and/or aforementioned flash events characteristic of the stepped leader as described hereinabove.

The digital capability of the mixed signal processor 76 further provides for additional functions to be incorporated into this embodiment. Such functions may include recording lightning spectral and flash sequence data to be collected for subsequent down loading and analysis. To accomplish this non-volatile RAM is incorporated for storage of the intensity of the flash event.

The mixed signal processor (MSP430) 34 allows for up to four photodiode/trans-impedance amplifier sensors to be utilized. Each of the four amplifiers may incorporate spectral filters to allow detection of specific wave lengths of light in the 300 nm to 1100 nm range, i.e. ultraviolet, visible, and infrared portions of the spectrum.

Each of such four photodiode sensor outputs is calibrated to provide equivalent responses at their prescribed spectral ranges and may each be interpreted on an absolute or relative basis. The clock speed of the microprocessor i& the MSP430 at 4 MHz provides for ample sampling rates to characterize a lightning flash with stroke events of one millisecond (ms) duration. A higher clock speed and therefore more powerful mixed signal processor may also be used to achieve sampling rates necessary to adequately detect the frequencies characteristic of the stepped leader.

A further extension of the analog/digital embodiment of the lightning trigger device may include using additional channels of the mixed signal processor 76 to actuate additional isolation relays for triggering multiple cameras for specific spectral sensitive films. A high-speed video camera (not shown) may also be triggered that would allow correlation of the spectral signature and individual strokes of the lightning flash. An electric field sensor (not shown) may also be incorporated on an input to provide increased field sensing capability that may indicate an incipient lightning discharge thereby alerting the user of possible danger.

Figure 5:
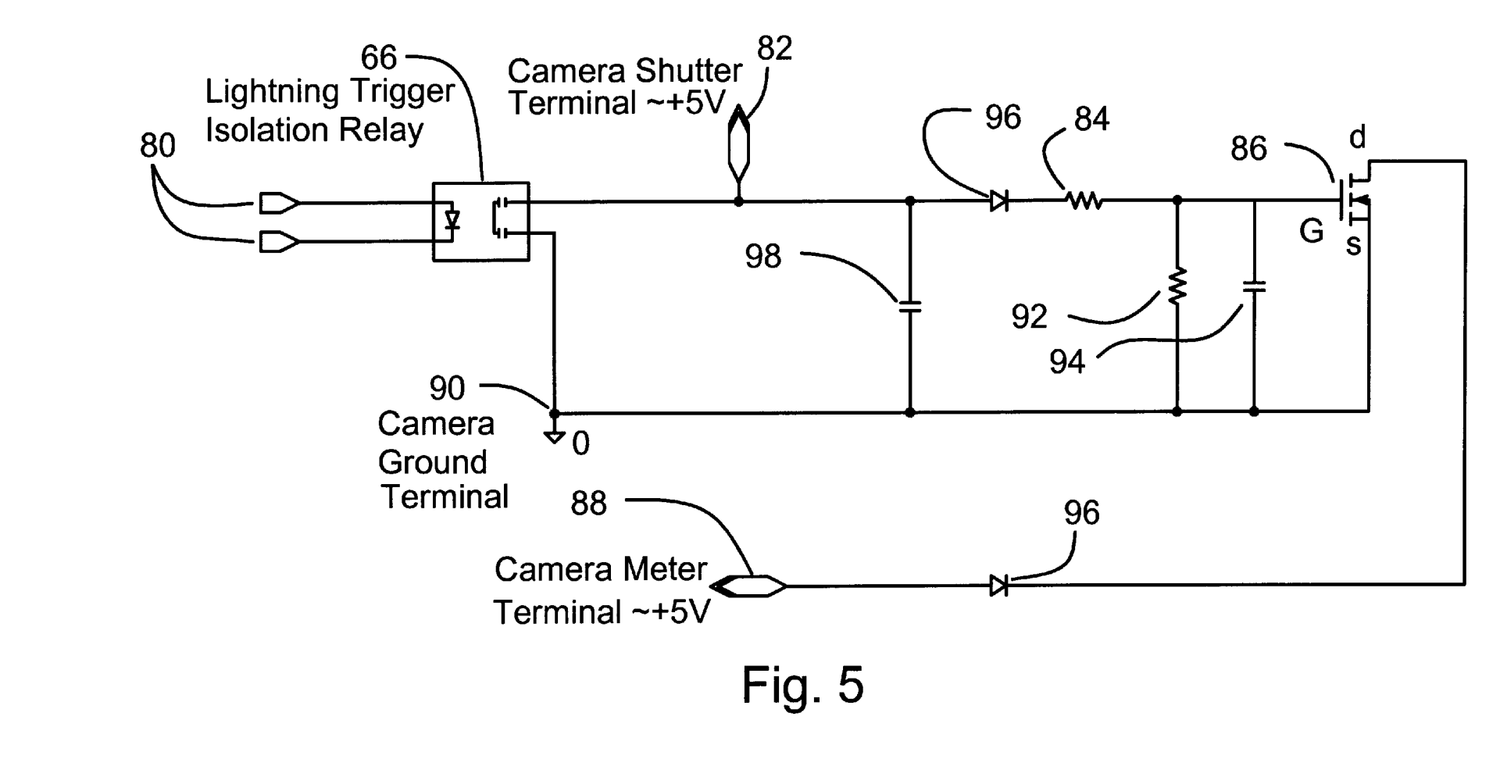
FIG. 5 is a diagram of the photographic lightning trigger circuitry for independently pre-activating the camera metering system.

Referring now to FIG. 5, there is shown an electronic circuit for reducing the shutter lag time of a camera sufficiently to ensure complete shutter opening within the time frame of the target lightning event. Depending on the particular camera, the shutter lag time may be reduced as much as 185 milliseconds by pre-activating the metering system and thus enabling a greater opportunity for more return strokes to be captured on film.

To this end, the normally open isolation relay is activated via inputs 80 from the timer circuit of the foregoing embodiments. The voltage from the camera shutter release terminal 82 is applied through resistor 84 to the base of a FET 86. The value of resistor 84 is selected to minimize current leakage through the FET 86 and prevent activation of the shutter until isolation relay 66 is activated. The applied voltage to the base of FET 86 enables the voltage from camera meter terminal 88 to be shorted at camera ground terminal 90, thus activating the camera metering system, not shown.

The resistor 92 and capacitor 94 form an R-C circuit that continuously enables the FET 86 and thereby the camera metering system for approximately 60 milliseconds after the isolation relay is activated. Resultantly, the camera shutter release terminal 82 is shorted to the camera ground terminal 90. This continuous enabling of the metering system ensures that the exposure information is available throughout the shutter lag time period. Once the isolation relay 66 is deactivated after completing the timing function, the camera metering system is electrically reset via the camera's internal circuitry and the metering function is thereby reset.

Diodes 96 are employed to prevent any feedback currents into the camera circuitry and prevent possible damage thereto. Capacitor 94 is utilized to stabilize the described metering activation circuitry 1.

Figure 6:
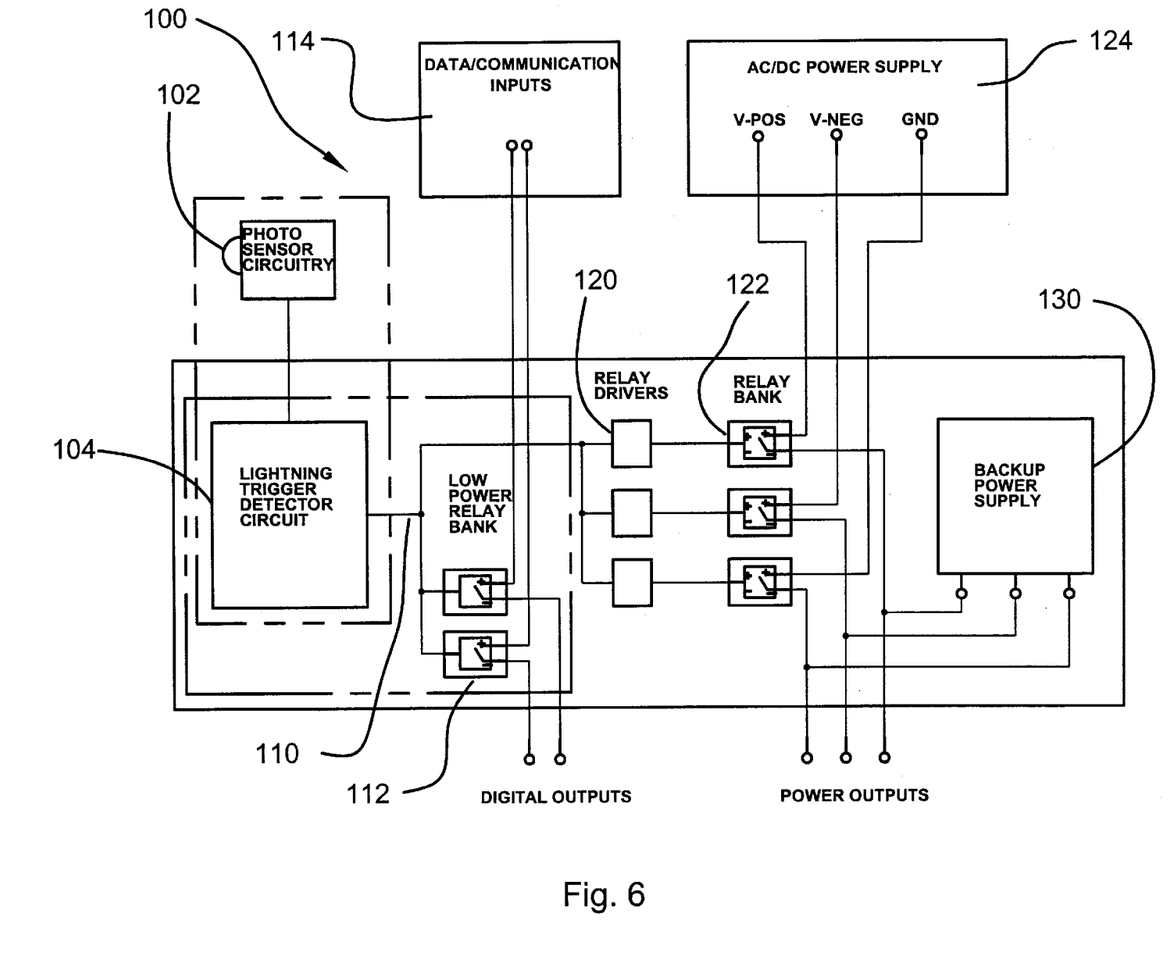
FIG. 6 is a block diagram of an alternative embodiment of the lightning trigger system showing the arrangement of the stepped leader detection and electrical protection system.

Referring to FIG. 6 there is shown an alternative embodiment of the lightning trigger-detection device for protecting auxiliary devices, such electronic and electrical devices, from the destructive effects of the lightning return stroke by detecting preemptively the initiation of the stepped leader. Therein, the lightning trigger device 100 includes the photosensor detection system 102 described above, the output of which is input to detector circuit 104. The detector circuit uses a tuned band pass filtering system to distinguish the characteristics of the stepped leader from the characteristics of the return stroke. The filtering system, as described in greater detail below passes only the current in a frequency range of the photodiode sensor 50. For example the filtering system may include a first band pass filter and a second band pass filter to detect different stepped leader characteristic, such as the aforementioned rise time and impulse periods. The luminous ranges of the stepped leader and the corresponding band pass filters of interest are the rise time frequencies of approximately 500 to 2,500 kHz and representative impulse center frequency of 20 kHz, which may range from approximately 16 kHz to 50 kHz. The band pass filtering system may also incorporate frequency recognition circuitry to further ensure that the detected optical frequencies are coincident and are in the range characteristic of the stepped leader. The frequency recognition circuitry may also incorporate mathematical methods such as Fourier Transform analysis or simple coincidence techniques to ensure the occurrence of the stepped leader event More particularly, the lightning trigger-detector circuit 104, preferably the embodiment in principal shown in FIG. 3 is connected with the photo sensor circuitry 102 comprised of components: lens 42, enclosure 34, photodiode 50, transimpedance amplifier 52 and photoresistor 54. The sensor circuitry is remotely mounted for convenience and compactness in a window or other manner to enable viewing of the lightning flash. By appropriate connections the detector circuit may be located convenient to the location of the electronic or electrical devices being protected. The highly sensitive circuitry of the preferred embodiment enables detection of the stepped leader and distance exceeding five miles regardless of the orientation of the sensor due to the atmospheric scattering of the light. The detector and sensor components may be comparable to the above embodiments upstream of the isolation relay and/or like control systems for the camera application.

The output 110 from the detector circuit 104 is connected isolation relays 112 controlling data communication inputs 114, such as data or communication sources, having low power requirements. The output 110 is also input to solenoid relay driver(s) 120 controlling a relay bank of isolation relays 122, selected on the basis of high output-input isolation voltages, high breakdown voltages and rapid release times for protection of higher power requirement auxiliary devices at AC/DC power supply 124.

For instance, applications protecting electronic and electrical devices which operate on greater than one-ampere, reed relays such as those known as ERG Components HVK1 form A/B may be used to provide 17,000 volts isolation at one-millisecond release time. Solid state relays may also be utilized where breakdown voltage and response are suitable for the application. In general, for return stroke and EMP isolation, the relays should have specifications of less than one-millisecond release times, high output-input isolation voltages and breakdown voltages of greater than 6,000 volts in open circuit state.

Typically, more than one power, data or communication source transmission line is required. Isolation relay(s) 112 and 122 may be provided for each line that may conduct the damaging return stroke surge and EMP to the electronic or electrical device. For example, it is common to have positive, neutral and ground conductors for a single-phase AC power supply. In this application, three isolation relays 30 or 50 would be provided for protection of the electronic or electrical devices.

A backup power supply 130 may also be incorporated to ensure that as isolation relay(s) 112 and/or 122 are disconnected from the power, data or communications source that the electronic or electrical device can remain in continuous operation until the return stroke surge and EMP are dissipated. A nominal duration of five seconds may be used for the timer circuit to maintain the isolation relays. However, for some applications it may be desirable to switch to non-conductive state during return strokes and to conductive state between return strokes, etc. Such an application might be suitable for critical digital data transmission. After the said nominal period of open circuit state of isolation relays, the backup power supply will resume the normal operational mode.

Figure 7:
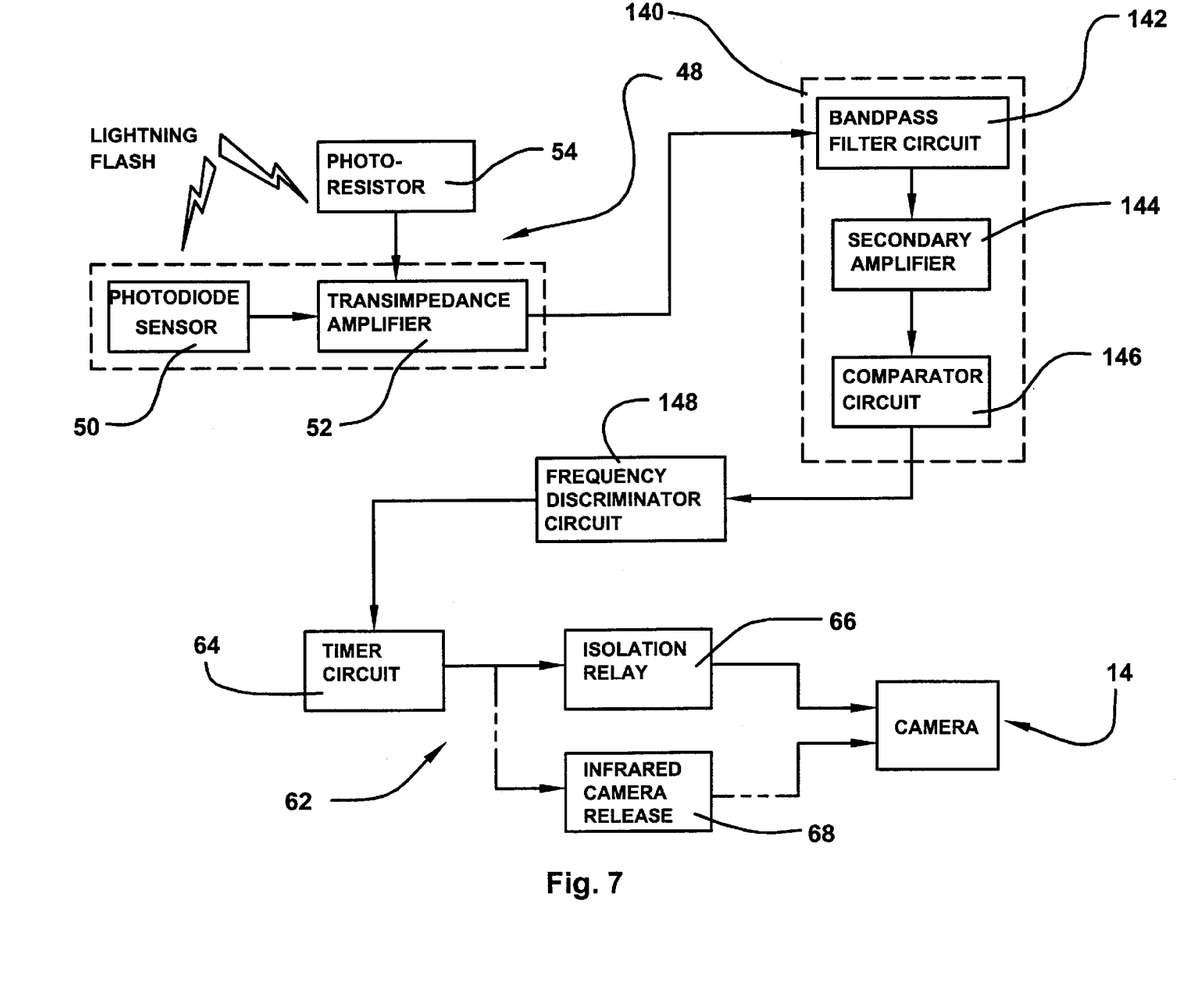
FIG. 7 is a block diagram of another embodiment of the invention.

For control applications wherein the preemptive ability to detect the stepped leader event to protect against adverse consequences attendant to the return stroke, as previously mentioned, it is desirable to detect multiple unique characteristics of the stepped leader event. One such embodiment is illustrated in FIG. 7, wherein the above described detector system 48 including photodiode 50, amplifier 52 and photoresistor 54 is output to the signal processing system 140. Therein the processing system 140 includes filter circuit 142 for distinguishing ambient conditions. The filter circuit 142 is input to secondary amplifier 144 and to comparator circuit 146, the later of which are comparable to the previously described embodiments. The output from the processing system 140 is input to a frequency discriminator circuit 148. For the stepped leader event, the discriminator circuit may pass the periodic characteristic, i.e. 20 kHz center band within a range of 8 to 50 kHz, or the rise time characteristic of 1 MHz within a range of 300 kHz to 3 MHz. Accordingly output satisfying such discrimination is input to the control system 62 including the timer circuit 64, the isolation relay 66 and the infrared camera release 68. The output from the control system is operative at the camera 14, with or without the metering bypass function, to ensure full shutter opening prior to the lightning return stroke.

Referring to FIG. 8, there are illustrated embodiments of the processing function for interfacing the detection system 48 with the control system 62. FIG. 8a illustrates an embodiment for various lightning events as described with reference to FIG. 7.

Figures 8, 8D:
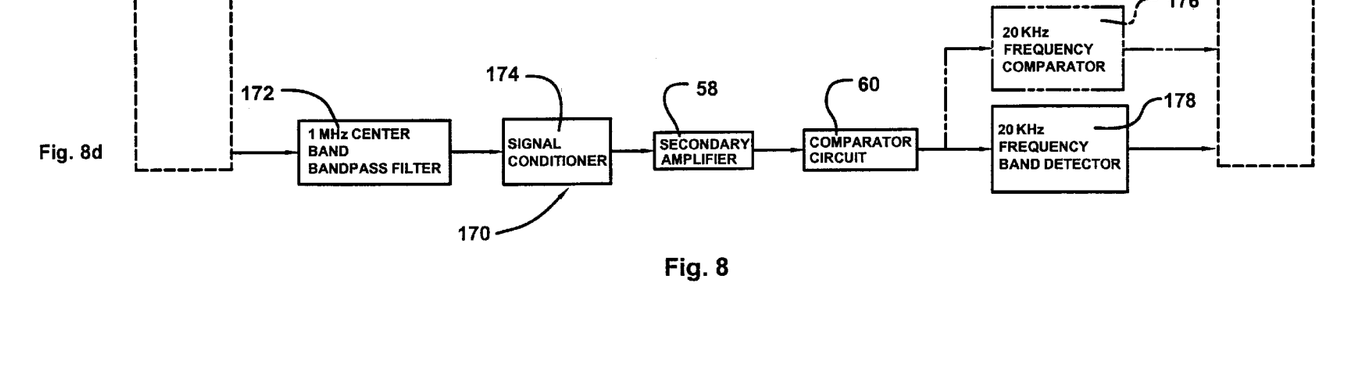
FIGS. 8a through 8d are block diagrams of further embodiments for the interface between the lightning trigger circuit and the timer circuit for the lightning trigger device.
Figure 8A:
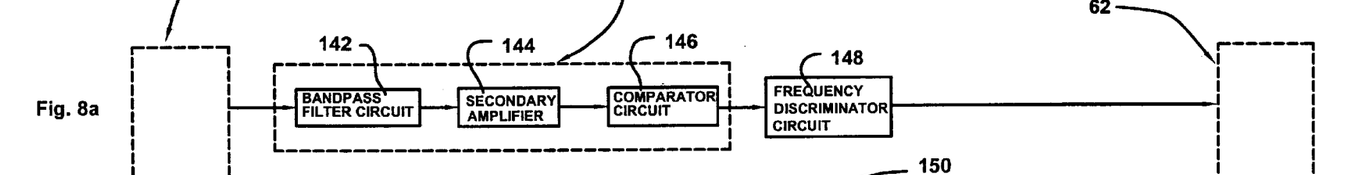
Figures 8B, 8C:
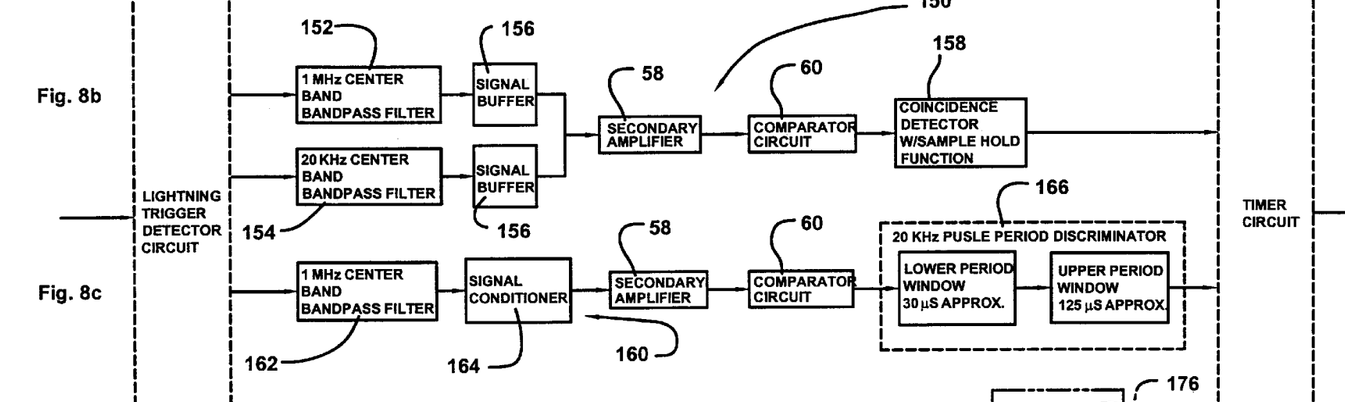

Referring to FIG. 8b, there is illustrated a processing 150 for preemptive use comprising a characteristic rise time bandpass filter 152, 1 MHz center band, in parallel with a characteristic periodic bandpass filter 154, 20 kHz center band. The output of filters 152, 154 is input to buffers 156 effective for providing isolation of the respective outputs. The output of buffers 156 is input serially to the secondary amplifier 58 and comparator circuit 60 as described above. The output of the comparator circuit 60 is input to a coincidence detector 158 having a sample hold function. The detector 158 holds the rise time signal until the periodic signal and thereafter determines output to the control system 62.

Referring to FIG. 8c, a further control system 160 includes a rise time, 1 MHz center band filter 162 that is input to signal conditioner 164. The signal conditioner 164 shapes the signal to reduce transients and passes signals only above a certain level, thereby eliminating extraneous influences such as environment conditions. The output of the signal conditioner 164 is serially input to the secondary amplifier 58 and comparator circuit 60 as described above. The output from the comparator circuit 60 is input to pulse period discriminator 166. The discriminator 166 is triggered in response to the first rise time signal and thereafter uses a lower window 167 and upper window 168 to determine if the succeeding impulse is within the time frame characteristic of the stepped leader event. Upon compliance the signal is input to the control system 62.

Referring to FIG. 8d, a processing system 170 includes a rise time band pass filter 172, signal conditioner 174, secondary amplifier 58 and comparator circuit 60 as described above. The output from the comparator circuit 60 is input to a frequency comparator 176 and frequency band detector 178. Both circuit determine if input frequencies are within a characteristic range. The comparator 176 uses multiple comparators. The detector 178 uses flip-flop devices.

Figure 9:
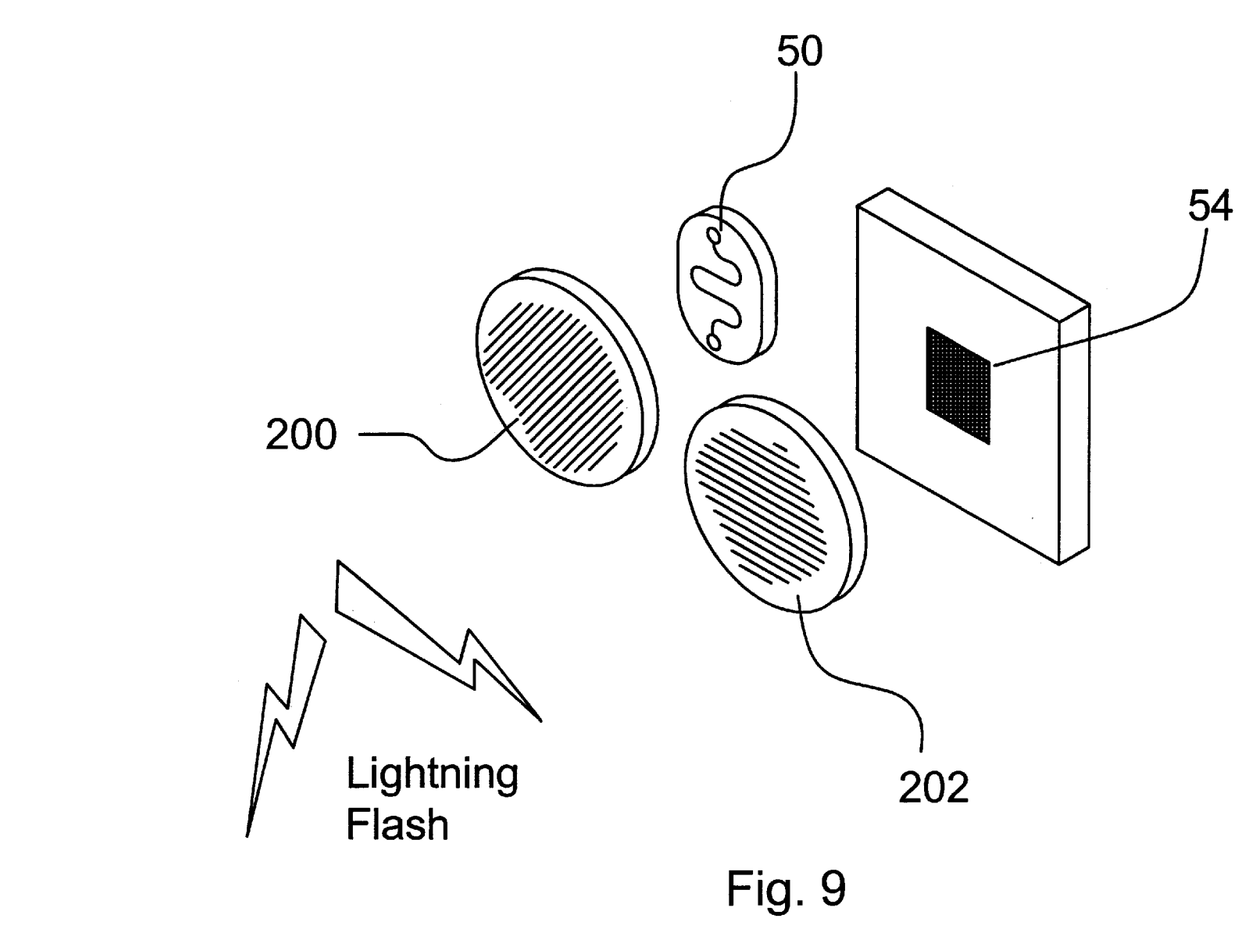
FIG. 9 is schematic view of the spectral filters for the photodiode sensor and photoresistor sensor of the present invention.

Further definition of the optical characteristics for the sensors may be accomplished as shown in FIG. 9. Therein the photodiode sensor 50 is provided with a spectral filter 200 for screening non-lightning frequencies outside the spectral lightning range. The photoresistor 54 is provided with a spectral filter 202 for screening frequencies outside the range of ambient conditions. Of course, such discrimination may also be directly incorporated into commercially available sensors.

The hereinabove described alternative embodiment may be extended to provide protection for any wired and/or wireless means of communication, digital and/or analog (RF), AC/DC power transmission for any electronic or electrical device requiring protection from lighting return stroke and EMP surges within the time period of the same lightning flash.

From the above it can be seen that the photographic lightning trigger-detecting device of the present invention provides the user with a practical method and apparatus for photographing lightning strikes.

The present lightning trigger device is capable of interfacing with many commercially available cameras that have sufficiently fast shutter lag times and is adaptable to function with the camera's remote electronic shutter release or the infrared shutter release.

The inherent portability of the lightweight, compact device allows the user to safely obtain lightning photographs using a hand-held camera while inside a car, house, or protective structure.

Furthermore, from the above it can be seen that the photographic lightning trigger-detection device of the present invention provides the user with a practical method and apparatus for the protection of electronic and electrical devices from the damaging effects of lightning strikes by detection of the initiation of the stepped leader and isolating the said devices from the damaging effects of the return strokes within the time period of the same lightning flash.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A lightning sensor device detecting the initiation of a lightning stepped leader event of a lightning flash comprising:

a. sensor means for detecting said stepped leader event and producing an output signal in response thereto;

b. a comparator circuit electrically connected to said sensor means for monitoring said output signal and discriminating between a stepped leader event and ambient events;

c. a first band pass filter coupled with said output signal and passing only the impulse frequencies characteristic of the stepped leader event having a center band frequency of about 20 kHz within a range of approximately 8 to 50 kHz;

d. a second band pass filter coupled with said output signal and passing only the frequencies characteristic of the stepped leader at the stepped leader impulse nominal one-microsecond rise time within a frequency range of approximately 300 KHz to 10 MHz; and e. control means for receiving said output signals from said first and second band pass filters and producing a controlling output signal in response thereto.

2. The lightning sensor device as recited in claim 1 wherein said sensor means are optical sensors.

3. The lightning sensor device as recited in claim 1 wherein said sensor means are radio frequency sensors.

4. The devices as recited in claim 1 including a frequency recognition circuit for discriminating and verifying that said frequencies passing said band filters have the characteristic signature of the stepped leader comprising coincident frequency recognition.

5. The device as recited in claim 1 wherein said sensor means consists of a primary photosensor is selected from a group comprising photodiodes, photoresistors, phototransistors, charge coupled devices and photocells.

6. The device as recited in claim 5 wherein said primary photosensor is electrically connected to an amplifier and said primary photosensor functions to adjust the gain of said device based on the difference between said ambient light levels and said flash event levels.

7. The device as recited in claim 5 wherein an optical filter operatively associated with said photosensor is utilized to pass only frequencies in the spectral range the 560 to 660 nm.

8. A detection device as recited in claim 1 wherein said control means includes switching means for isolating electronic and electrical devices connected thereto from the damaging effects of the lightning return strokes of a lightning event associated with said stepped leader.

9. A lightning detection device for sensing pulsed propagating frequency characteristics occurring during the initiation of the stepped leader event of a lightning flash, comprising: optical sensor means effective for receiving luminous signals in the spectral range of about 300 to 1100 nm. and providing an output in response thereto; a first band pass filter coupled to said output effective for passing only the portion of the output in the range of approximately 8 kHz to 50 kHz; a second band pass filter coupled to said output for passing the frequencies characteristic of the stepped leader at the stepped leader impulse nominal one microsecond rise time frequency range of approximately 300 kHz to 10 MHz; and means coupled to said first band pass filter and said second band pass filter receiving the outputs passed thereby and effecting operation of an auxiliary device operatively connected thereto.

10. The lightning detection device as recited in claim 9 wherein said first band pass filter is in the range of 16 kHz to 33 kHz.

11. The lightning detection device as recited in claim 10 wherein said second band pass filter is in the range of 500 kHz to 2,500 kHz.

12. The device as recited in claim 9 including a frequency recognition circuit for discriminating and verifying that said luminous signals have the characteristic signature of the stepped leader comprising coincident frequency recognition means, frequency comparison means and RF detecting means.

13. A preemptive sensor for detecting the stepped leader phase of a lightning event and protecting an auxiliary device connected to a main power supply and a backup power supply, comprising: optical sensor means effective for receiving luminous signals in the spectral range of about 300 to 1100 nm. and providing an output in response thereto; a first band pass filter coupled to said output effective for passing only the portion of the output in the range of approximately 8 kHz to 50 kHz; a second band pass filter coupled to said output for passing the frequencies characteristic of the stepped leader at the stepped leader impulse nominal one-microsecond rise time frequency range of approximately 300 kHz to 10 MHz; and relay means coupled between the auxiliary device and said first and second band pass filters for receiving the outputs passed thereby and effective to disable said main power supply and maintain said back up power supply until after completion of said lightning event.

14. A preemptive sensor as recited in claim 13 wherein said optical sensor means includes a first photosensor electrically connected to an amplifier and including means for creating an output for luminous emission within the spectral range of 300 to 1100 nm., and a second photosensor operatively connected to said amplifier for adjusting the gain of said amplifier said photosensor based on the difference between said ambient light levels and said lightning event levels.

15. A preemptive method of controlling a device prior to the return stroke of a lightning event comprising: detecting spectral emission from a stepped leader emission characterized by about a 20 kHz impulse period and about a one microsecond rise time at about 1 MHz; and, based on said detecting, controlling said device.

16. The preemptive method as recited in claim 15 wherein said impulse period is in the range of about 8 to 50 kHz and the frequency of said rise time is in the range of about 300 kHz to 10 MHz.

17. The preemptive method as recited in claim 15 wherein said impulse period characteristic is in the range of about 8 to 50 kHz and the frequency of said rise time characteristic is in the range of about 300 kHz to 10 MHz.

18. A preemptive method of disabling a device prior to the return stroke of a lightning stroke, comprising the steps of: detecting the 20 kHz impulse period characteristic and a one microsecond second rise time characteristic at about 1 MHz of the stepped leader in a lightning event; and disabling said device in response to said detecting until at least completion of said return stroke.

* * * * *